United States Patent [19]

Shaw

[11] 4,312,909
[45] Jan. 26, 1982

[54] INSULATING MATERIAL OF METAL FILM BONDED TO NON-WOVEN GLASS FABRIC WITH ETHYLENE/VINYL ACETATE COPOLYMER ADHESIVE

[76] Inventor: Julius Shaw, 79 Brook St., New Bedford, Mass. 02746

[21] Appl. No.: 178,794

[22] Filed: Aug. 18, 1980

Related U.S. Application Data

[62] Division of Ser. No. 32,286, Apr. 23, 1979, Pat. No. 4,242,165.

[51] Int. Cl.³ .............................................. B32B 17/10
[52] U.S. Cl. .................................. 428/215; 428/285; 428/286; 428/441; 428/461
[58] Field of Search ............... 428/220, 215, 285, 286, 428/441, 461; 156/242, 272, 301, 302, 307, 313, 324, 332

[56] References Cited

U.S. PATENT DOCUMENTS

| | | | |
|---|---|---|---|
| 2,706,699 | 4/1955 | Plansoen et al. | 156/332 |
| 3,262,192 | 7/1966 | Vukovean et al. | 156/313 |
| 3,769,146 | 10/1973 | Rovel | 428/285 X |
| 3,810,816 | 5/1974 | Zachariades | 156/332 X |
| 3,902,951 | 9/1975 | Doi et al. | 156/313 |
| 4,119,479 | 10/1978 | Williams | 156/332 X |

Primary Examiner—Marion McCamish
Attorney, Agent, or Firm—William Nitkin

[57] ABSTRACT

A laminated insulating material comprised of a metal foil sheet bonded to a non-woven glass fiber paper-like sheet by a latex acrylic adhesive.

1 Claim, 2 Drawing Figures

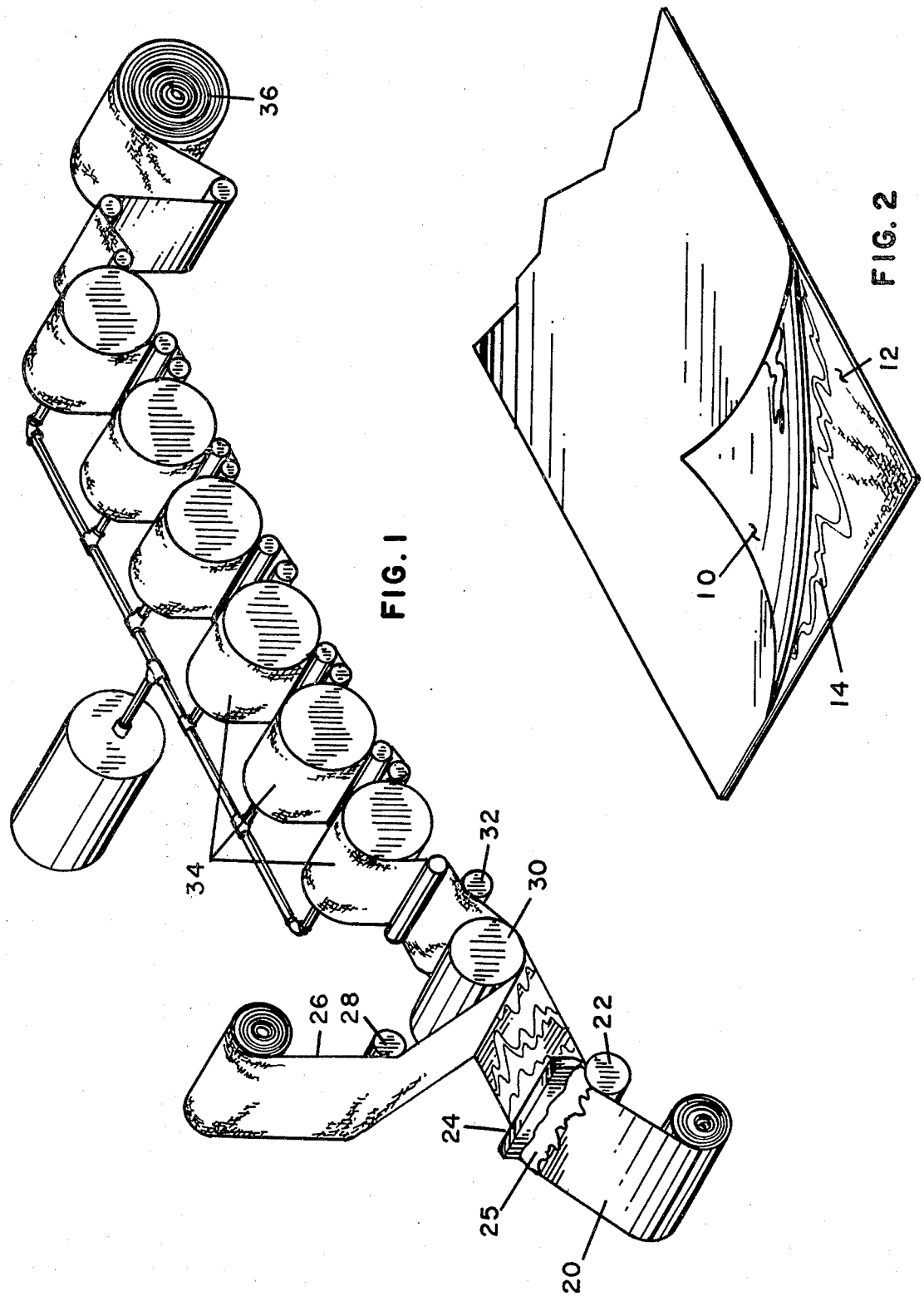

INSULATING MATERIAL OF METAL FILM BONDED TO NON-WOVEN GLASS FABRIC WITH ETHYLENE/VINYL ACETATE COPOLYMER ADHESIVE

This application is a division of application, Ser. No. 032,286 filed Apr. 23, 1979, now U.S. Pat. No. 4,242,165, for Insulating Material and Process for Manufacturing Same by Julius Shaw.

BACKGROUND OF THE INVENTION

1. Field of the Invention

The product and process disclosed herein reside in the field of insulating materials and processes for making same and more particularly relate to an improved, relatively thin material utilized for insulation especially in construction of electrical and/or heat-producing devices.

Materials for heat insulation in the construction of electrical and/or heat-producing devices such as light fixtures have long been utilized. In the past they have often taken the form of non-combustible materials bonded to a backing, for example, asbestos fibers bonded to a metal foil. The advantage of asbestos is that it has high temperature and flame resistance. Unfortunately asbestos has been found to be a carcinogen and is no longer a favored material for the manufacture of such relatively thin insulating materials. Currently in use is ceramic paper, but this material is extremely expensive and its widespread use is thereby limited.

2. Summary

It is an object of the present invention to provide an improved, relatively thin material in laminate form and a process for producing same that can be utilized for insulating purposes and have light and heat reflecting properties.

It is a further object that the material of the present invention can be supplied in sheets, rolls or pieces cut to a desired shape.

It is another object of this invention to provide a fire and heat resistant material which will neither rot nor corrode, will have flexibility to conform to the areas of its use and yet not have any harmful characteristics.

It is a further object of the present invention to provide a low-density insulating material that is both dimensionally stable and lightweight and which can be utilized in a variety of areas such as electric lighting fixtures, electronic equipment, and the like.

BRIEF DESCRIPTION OF THE DRAWINGS

FIG. 1 is a perspective view of a segment of the laminate of this invention.

FIG. 2 is a perspective view of the apparatus for manufacturing the laminate of this invention.

DESCRIPTION OF THE PREFERRED EMBODIMENT(S)

The insulating material of this invention seen in FIG. 1 is a laminate comprised of a metal foil 10 bonded to a non-woven glass fiber paper-like material 12. The metal foil of this invention which can be aluminum foil or other equivalent metal foils, can be provided in a thickness of 0.0007 in. to 0.001 in. The non-woven glass fiber paper-like material can be provided in the range of 0.015 in. to 0.070 in. The laminate of this invention has a wide range of uses utilizing such glass fiber paper-like material in a thickness of 0.015 in. which is bonded to a 0.001 in. aluminum foil. A plasticized ethylene vinyl acetate co-polymer emulsion or equivalent latex acrylic is used as an adhesive to bind the metal foil to the glass fiber paper-like material. One such adhesive is supplied by American Finish and Chemical Co. of Chelsea, Mass. and has a product number of SRD870. Equivalent adhesive materials can include vinyl acetate homo-polymers which make use of plasticizers to soften the film formed to improve flexibility of the laminate such as phthalate esters, phthalyl glycolates or phosphate esters. In the process of manufacturing the insulating laminate of this invention, one can utilize rolls of metal foil such as aluminum foil and rolls of a non-woven glass fiber paper-like material, the rolls being of substantially equal width. In FIG. 2 aluminum foil web 20 is passed over a resilient rubber roller 22 above which is disposed a knife 24. Positioned before knife 24 is adhesive 25 resting upon foil web 20 which passes under knife 24. Knife 24 is disposed above roller 22 and web 20 approximately 3.5 mils so as to allow some adhesive 25 to be carried on web 20 under knife 24. Rubber roller 22 helps to allow for any unevenness in the web to protect knife 24. The adhesive can be mechanically applied before the knife or can be ladled into position. As the web of foil passes thereunder, the adhesive forms a film thereon. It has been found that a knife height of 3.5 mm. cited above avoids the formation of any bubbles or bare spots upon the foil web and provides for an even dispersement thereon of the adhesive. If too much adhesive is used, it is wasteful and also can affect the flexibility of the laminate. Disposed above the foil web is a roll containing the glass fiber paper-like web in the thickness and dimensions cited above. The glass fiber paper-like web is passed under an expander roller 28 to remove wrinkles and then under a marriage roller 30 which it mates with foil web 20 and the laminate thus formed passes over an idler roller 32. The glass fiber paper-like web 26 and foil web 20 are further compressed together with the adhesive forming a bond therebetween, the adhesive being forced from the bottom web into the interstices of the glass fiber paper-like material. The laminate is passed over a series, preferably six, of can rollers 34, each composed of stainless steel heated usually by steam to a temperature range of 225° F.–240° F. which heat treatment cures the adhesive for a more permanent bond. It has been found that if the laminate dries without sufficient heat, over a period of time the polymers in the adhesive will not properly bond and the laminate will separate. The laminate upon exiting from the last can roller 34 is then rolled upon a take-up reel 36. The glass fiber paper-like material may be somewhat thicker before lamination as there is a certain amount of compression which takes place in the process of this invention. The laminate material after curing can then be utilized.

The laminated rolls are usually spread out into sheets for large applications or can be die cut into discrete shapes for particular uses in electrical apparatuses. Underwriters Laboratory has approved the use of the laminate of this invention insofar as there is no danger of fire. It has been found that the laminate of this invention can be used successfully with temperatures up to 600° F. and the metal foil provides good reflectance of both light and infrared rays in applications where such properties are desirable.

Although the present invention has been described with reference to particular embodiments, it will be apparent to those skilled in the art that variations and modifications can be substituted therefor without departing from the principles and spirit of the invention.

I claim:

1. A laminate for use in insulation of electrical apparatuses comprising:
   a metal foil sheet such as aluminum foil, having a thickness of between 0.0007 in. and 0.001 in.;
   a non-woven glass fiber paper-like sheet having a thickness of between 0.015 in. and 0.070 in.; and
   a plasticized ethylene vinyl acetate co-polymer emulsion-type adhesive bonding said metal foil sheet to said non-woven glass fiber paper-like sheet.

* * * * *